No. 828,502. PATENTED AUG. 14, 1906.
C. H. POPE.
KNIFE CLIP FOR REAPER AND MOWER CUTTERS.
APPLICATION FILED SEPT. 15, 1904.
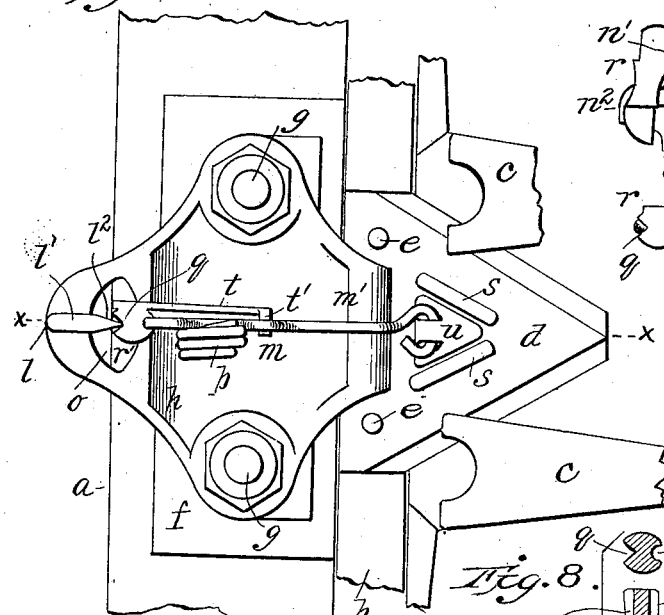
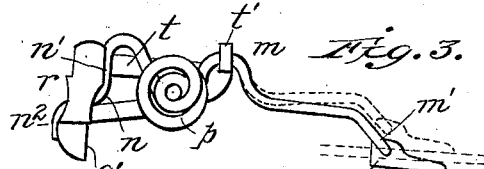
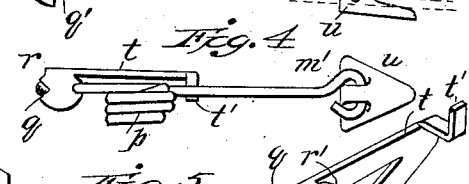
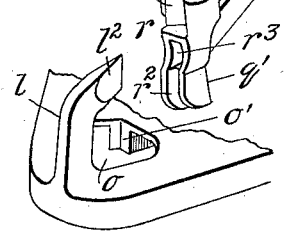
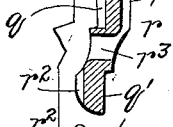
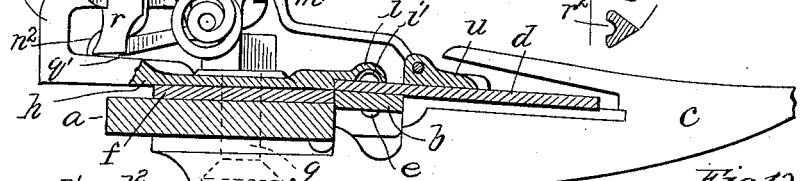
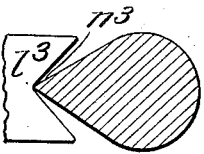
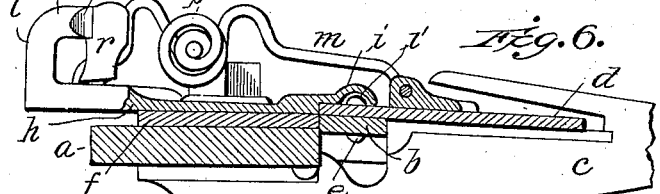
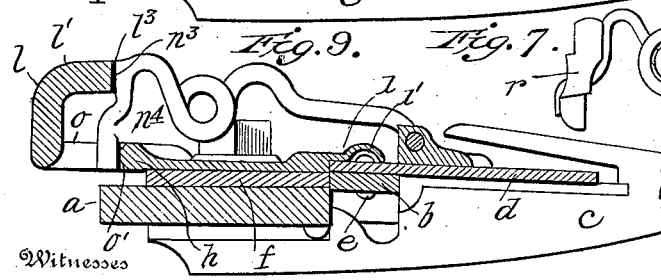
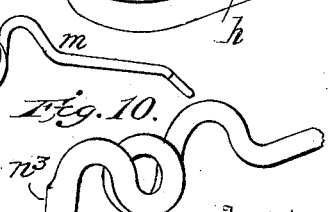
Witnesses
Edwin L. Yewell,
Auguste J. Lix,
Inventor
Charles H. Pope
By A. H. ——
Attorney

UNITED STATES PATENT OFFICE.

CHARLES H. POPE, OF MOLINE, ILLINOIS, ASSIGNOR TO HOPKINS PATENT COMPANY, OF MOLINE, ILLINOIS, A CORPORATION OF ILLINOIS.

KNIFE-CLIP FOR REAPER AND MOWER CUTTERS.

No. 828,502.            Specification of Letters Patent.          Patented Aug. 14, 1906.

Application filed September 15, 1904. Serial No. 224,606.

*To all whom it may concern:*

Be it known that I, CHARLES H. POPE, a citizen of the United States, residing at Moline, in the county of Rock Island and State of Illinois, have invented certain new and useful Improvements in Knife - Clips for Reaper and Mower Cutters, of which the following is a specification, reference being had therein to the accompanying drawings.

Figure 1 is a plan view of a part of the cutting apparatus of a mowing-machine embodying my improvements. Fig. 2 is a cross-section of the same on the line $x$ $x$ of Fig. 1, parts of the apparatus being represented in elevation. Fig. 3 is a side view of a clip-spring detached. Fig. 4 is a top view of the spring. Fig. 5 is a perspective showing the rear part of the clip-plate and the saddle or spur for the spring. Fig. 6 is a view, partly in side elevation and partly in section, of a modified form of the device, the saddle or spur forming the stop for the spring being omitted. Fig. 7 is a side view of the spring and pivot-reinforce represented in Fig. 6. Fig. 8 is a vertical section and two horizontal sections through the pivot-reinforce detached. Fig. 9 is a view, partly in elevation and partly in section, of another modified form of the device. Fig. 10 is a perspective of the spring shown in Fig. 9. Fig. 11 shows a perspective of the modified form of the rear end of the clip-plate. Fig. 12 is a view of similar diagrammatic character to illustrate the relations of the spring to the abutting device when constructed and arranged in accordance with the present invention.

In the drawings, $a$ denotes the finger-bar; $b$, the cutter-bar; $c$, the guards, and $d$ $d$ the cutters or knife-sections that are secured to the cutter or knife bar by rivets $e$. The parts just referred to may be of any preferred construction, and no particular description of them in detail is necessary, as they are now well understood, and the present improvement is applicable to any of the many forms of cutting apparatus. I prefer, however, to have some of the cutters or knife-sections $d$ $d$ formed or provided with retaining devices to hold or assist in holding in place the toe-pieces or shoes of the clip-springs.

$f$ indicates the usual wearing-plate, which is seated upon the finger-bar and has its front edge flush with the front edge of the bar. Upon this wearing-plate is placed the clip bracket plate or holder, which is fastened in position by means of bolts $g$, passing through the bracket, the wearing-plate, and the finger-bar. This bracket or holder $h$ is approximately rectangular in form when looked at in plan, as in Fig. 1, and has a lip $i$ extended well forward, so as to overhang the cutter-sections $d$ $d$. This overhanging lip is concave, as shown at $i'$, to provide clearance for the rivet-heads $e$.

At the rear edge and preferably at the center longitudinally the clip bracket or plate $h$ is provided with an upwardly-extending arm $l$, which is turned forward, so as to have a finger $l'$, provided at its front end with a sharp knife-edge $l^2$. At $o$ there is an aperture extending through the plate $h$, and the front wall of this aperture has a V-shaped recess or knife-edge bearing at $o'$, the operative line of this bearing coinciding with the operative line of the knife-edge $l^2$.

A form of the spring, by itself considered, which can be employed is shown and is indicated as a whole by $m$. At its rear end it has a downwardly-bent leg $n$, formed with a part $n'$ and offset, so as to have the part $n^2$ at the bottom. The part $n'$ is horizontally opposite the knife-edge $l^2$, and the part $n^2$ is horizontally opposite the recess $o'$.

The part of the spring designated as a whole by $n$ constitutes the axial portion of the spring—that is to say, the axis about which the spring vibrates passes through this part.

The central part of the spring may be coiled upon itself, as indicated at $p$, and the forward projecting part is carried out from the coil in such way as it shall lie in substantially the same vertical plane as the rear part.

A reinforcing-socket and wearing-block is in the construction shown in Figs. 1 to 4 interposed between the spring and the plate $h$. This reinforcing-socket consists of a small piece of metal $r$, having a groove at $r'$ at the upper end on the front side, a groove $r^2$ at the lower end on the rear side, and an aperture $r^3$ extending through it at the ends of the grooves. At $q$ there is formed a V-shaped recess or bearing to receive the knife-edge $l^2$, and at $q'$ there is formed a knife-edge adapted to fit in the bearing-recess $o'$.

$t$ is an arm formed with or secured rigidly to the part $r$ and extending forward by the side of the spring $m$. It has an offset at $t'$ lying under the front part of the spring, and which forms a saddle or support for the spring, thus limiting the downward movement thereof—that is to say, this saddle or support prevents the spring from pressing at its forward end downward to the fullest extent possible. At the forward end the spring may be supported by a disk, as shown in Patent No. 718,351, or by a suitable shoe $u$.

I have thus described in detail the features of construction and relative arrangement of the parts constituting my improved cutter-cap, and will now call attention to the following matters incident thereto.

Numerous cutter-caps of various sorts have been heretofore used or proposed, and I have had considerable experience in the manufacture and use of several styles of these devices, particularly with such as are shown in Patents No. 665,527, January 8, 1901, No. 697,407, of April 8, 1902, and No. 718,351, of January 13, 1903, granted to Harvey L. Hopkins, and the present improvements have resulted from my experience therewith. It has been found that the coiled springs employed in devices of this sort are liable to be rapidly deteriorated under the constant and rapid vibrations to which they are subjected. This deterioration I have found results from two causes—first, the friction and wear upon the heel part of the spring when it is mounted in such way that the external surface of the spring metal itself is subjected to frictional wear and rubbing against the surface of the stationary wall of the journal or holder in which the spring is mounted, and, second, the direct contact of the toe part of the spring metal upon the cutter-plate, this resulting in a rapid wearing and deteriorating of the lower part. The springs are made of drawn wire, and as is well known the external surface is of the nature of a hardened shell, and when this is cut through the efficiency of the spring metal is lost. In the earlier devices this wearing and cutting of the external surface part of the spring-wire resulted from the slipping or sliding of the spring metal against the concave wall of the socket in which it was seated with more or less looseness, as shown in the said Patents Nos. 697,407 and 718,351. I have overcome entirely this tendency to wear away the surface part of the spring metal by providing knife-edges at the axis of its vibration. Preferably these knife-edges are furnished in the way above described—that is, by connecting the heel part of the spring-wire to a rocking or reinforcing block or socket, as at $r$, upon which may be formed either or both of the knife-edges. By reducing the pivotal part of the metal in this way I have practically entirely eliminated that which has been the troublesome factor in devices of this sort heretofore made—viz., the rapid wear of the vibrating parts.

The use of a separate pivot-block, such as that at $r$, is preferred where relatively fine wire is used for the spring. If this be made of wire of heavier gage and which is of sufficiently large diameter, the knife-edges may be formed directly thereon by shaping it in the way shown in Figs. 9 and 10—that is to say, it is formed so that at $n^3$ $n^4$ it shall be sharply tapered to provide knife-edges in horizontal section—and in such cases there are two cavity-bearings, one at $l^3$ in the plate and one at $o'$. By having a stop device or controlling device such as that shown at $t$ I am enabled to so shape and construct the spring that within limits it shall have a very powerful action of pressure, while beyond the limit the pressure shall be reduced or rendered *nil*. It is well known that in the cutting of those grasses or grains which are heavy there is a greater tendency for the cutters to be forced up from the ledger-plates and to be clogged because of the separation of one cutting edge from the other and the failure to maintain a sharp shear relation between them. This tendency is very much less where lighter grasses or grains are being cut. In the one instance the section requires to be held down with much greater power than in the other. By the employment of a device equivalent to that at $t$ I provide for meeting both these conditions with one and the same machine.

When the parts are being assembled, the spring $m$ is so adjusted as to its tension that while the sections are close to the ledger-plates but little force will be exerted, the spring at such time resting in its saddle and bearing particularly upon the stop $t$. When the cutters are at work upon heavy matted or tangled grasses or grains and there is a tendency to force the sections upward away from the ledger-plates, the spring is raised from the stop $t'$ and exerts its full power upon the section to hold it down; but while it is reciprocating in close contact with the ledger-plates a great part of its resilient power is dormant as concerns the section, this power being resisted by the support $t$. However, I do not wish to be understood as meaning that all of the features of the present invention are limited to the use of a saddle or limiting device for the spring. In Figs. 6 and 7 I have shown a bent wire spring with a reinforce pivot-block without the saddle or stop $t$.

In Fig. 11 I illustrate the fact that there can be reversion with respect to the upper and lower bearings on the plate against which the spring presses. In this case the upper bearing is a recess and the lower one a knife-edge projection. To these I fit a correspondingly-shaped spring or a correspondingly reinforce piece which should have a knife-edge at the upper end and a socket or cavity at the lower end.

It will be noticed that the rear part of the clip or holding plate $h$ differs from those heretofore used, in that there is no prolonged vertical tubular part in which the rocking axial portion of the spring is seated. These tubular bearing projections in earlier constructions were the cause of much trouble and inconvenience, as they collected earth and foreign material, so that there was not only a rapid increase in the wearing action of the journaling parts, but also a tendency to clog and refuse to respond rapidly with the movements required of them. In the present construction nothing is provided as a catch-plate for foreign material. The aperture at $o$ allows and insures that any material that gathers on the back part of the plate shall instantly escape downward. The knife-edge bearings are exposed in such way that clogging is practically impossible.

What I claim is—

1. In the cutting apparatus of a harvester or mower, the combination with the reciprocating cutter-sections and the relatively stationary support therefor, of a vibrating spring for holding down the cutter-sections, and knife-edged bearings for the spring substantially as set forth.

2. In the cutting apparatus for harvesters or mowers, the combination with reciprocating cutter-sections and the relatively stationary support therefor, of the vibrating spring the front end of which bears upon and reciprocates with a cutter-section, and having at its rear end a journal part mounted in a fixed support, and knife-edged bearings between the said fixed support and the journal part substantially as set forth.

3. In a cutting apparatus for harvesters or mowers, the combination with the reciprocating cutter-sections and the relatively stationary support therefor, of a vibrating spring the front end of which bears upon and reciprocates with one of the cutter-sections, and two knife-edged bearings for the spring, one arranged on one side and the other on the other side of the axial part of the spring, the bearings and the spring being so arranged as to cause the spring to exert pressure in opposite directions on the said bearings, respectively, substantially as set forth.

4. In the cutting apparatus for harvesters or mowers, the combination with the reciprocating cutter-sections and the relatively stationary support therefor, of a spring having its front end bearing upon and reciprocated with one of the cutter-sections, and having at its rear end a reinforce or journal piece connected thereto, mounted in a stationary holder, the spring being held against vibration relative to the reinforcing part, and both the spring and the reinforce vibrating together in relation to the holder, substantially as set forth.

5. In a cutting apparatus for harvesters or mowers, the combination with the reciprocating cutter-sections and the relatively stationary support therefor, of the holder for the said sections, consisting of the vibratory coiled spring having its front end arranged to bear upon and reciprocate with one of the cutter-sections, a reinforcing or journal part mounted in a stationary holder and connected with the spring and means for taking a part of the pressure of the spring from off the cutter-section when the latter is in position to closely engage with its ledger-plate, substantially as set forth.

6. In the cutting apparatus for harvesters or mowers, the combination with a reciprocating cutter-section, one or more opposing ledger-plates, and the relatively stationary support therefor, of the vibrating retaining-spring arranged to hold the cutter-section in contact with the ledger-plate, and means for greatly increasing the force of the said spring upon the cutter-section as the latter is lifted from the ledger-plate, substantially as set forth.

7. In the cutting apparatus for harvesters or mowers, the combination with the reciprocating cutter-section, one or more opposing ledger-plates and the relatively stationary support therefor, of the vibrating spring arranged to hold the cutter-section in contact with the ledger-plate, a stationary holder for the spring and a rocking reinforce or journal, interposed between the spring and the holder and carrying a stop or control device for controlling the action of the spring, substantially as set forth.

8. The combination with the reciprocating cutter-section, one or more opposing ledger-plates and the relatively stationary supporting device therefor, of a rocking spring, a stationary holder for the axial part of the spring, and a rocking reinforce inserted between the axial part of the spring and the stationary holder, the said rocking reinforce and stationary holder having knife-edge bearings substantially as set forth.

9. The combination with the reciprocating cutter-section, the one or more opposing ledger-plates, and the relatively stationary support therefor, of the vibrating coiled spring bearing upon and reciprocating at one end with the cutter-section and having at the rear end an axial part mounted in a stationary holder, and a supplemental reinforcing-journal part, having two oppositely-pressed knife-edge bearings on the stationary holder; substantially as set forth.

10. The combination with the reciprocating cutter-section and the relatively stationary support therefor, of the vibrating spring bearing at its outer end on a cutter-section and having at its rear end an axial part, the knife-edge bearings for the spring, and the spring-holding plate or clip secured to the stationary support and having the fixed parts of the said knife-edge bearings, and formed also with the aperture *o* adjacent to one of the said bearings, substantially as set forth.

11. In the cutting apparatus of a harvester or mower, the combination with the reciprocating cutter-sections, the ledger-plates, and the relatively stationary supports therefor, of a vibrating spring for holding the cutters down upon the ledger-plates, the spring at the rear having a substantially vertically-disposed axial part, and knife-edged bearings for the axial part of the spring, one arranged in front and the other in rear of such axial part of the spring, the said bearings being also disposed in different horizontal planes, substantially as set forth.

12. In the cutting apparatus of a harvester or mower, the combination with the reciprocating cutter-sections, the ledger-plates, and the relatively stationary supports therefor, of the vibrating spring bearing upon one of the cutter-sections and arranged to hold the latter down upon the ledger-plates and having a substantially vertically-disposed axial part at the rear, a stationary holder for the axial part of the spring, and a rocking reinforce inserted between the axial part of the spring and the stationary part of the holder, such rocking reinforce having engagement with the stationary holder by means of two knife-edged bearings, the bearings being upon opposite sides of the axial part of the spring and in different horizontal planes, and the spring being arranged to bear against the rocking reinforce opposite each knife-edge bearing, whereby the reinforce is held in position by the tension of the spring, substantially as set forth.

CHARLES H. POPE.

Witnesses:
    F. D. HOLT,
    HERBERT G. COPP.